3,466,376
ORTHO - ALKENYLPHENOXY - HYDROXYALKYL DERIVATIVES IN THE TREATMENT OF CARDIAC AND VASCULAR DISEASES

Arne Elof Brandstrom, Goteborg, Hans Rudolf Corrodi, Molndal, and Bengt Arne Hjalmar Ablad, Goteborg, Sweden, assignors to Aktiebolaget Hassle, Goteborg, Sweden, a company of Sweden
No Drawing. Continuation-in-part of application Ser. No. 521,436, Jan. 18, 1966. This application June 17, 1966, Ser. No. 558,226
Int. Cl. A61k 27/00; C07c 93/08
U.S. Cl. 424—330                       14 Claims

ABSTRACT OF THE DISCLOSURE

The specification discloses ortho, meta, and para-alkenylphenoxy-hydroxyalkyl derivatives of isopropylamine, specifically, allyl, 2-chloroallyl, 3-chloroallyl, and propenyl substituted phenoxy-hydroxy-isopropylaminopropanes, their preparation, pharmaceutical compositions containing these compounds, and the use thereof in the treatment of cardiac and vascular diseases.

---

The present invention relates to isopropanolamine derivatives and more particularly to alkenylphenoxy-hydroxyalkyl derivatives of isopropylamines and to methods for the preparation of such compounds. The invention also concerns the preparation of pharmaceutical formulations containing such alkenylphenoxy-hydroxyalkyl isopropylamines and to methods for the pharmacological employment of such compounds.

This application is a continuation-in-part of our copending application Ser. No. 521,436 filed Jan. 18, 1966.

The principal object of this invention is to provide new alkenylphenoxy-hydroxyalkyl isopropylamine compounds having valuable pharmacological properties.

It is still a further object of the invention to provide new compounds which can be formulated into pharmacological preparations in dosage units.

Another object of the invention is to provide compounds which may be employed in the treatment of cardiac and vascular diseases.

Still another object of this invention is to provide novel compounds which have valuable diuretic properties.

It is a still further object of the invention to provide medicinal compounds which can be used to protect a patient's heart against excessive sympathetic stimulation.

It is a still further object of the invention to provide new medicinal compounds which can be used in the treatment of cardiac and vascular diseases to protect the patient's heart against increased blood levels of epinephrine and norepinephrine.

It is a further object of the invention to provide novel compounds for the treatment of cardiovascular diseases which have local anesthetic effects.

Another object of the invention is to provide simple methods for the preparation of alkenylphenoxy-hydroxyalkyl isopropylamines.

These and other related objects are achieved by providing new alkenylphenoxy-hydroxyalkyl isopropylamine derivatives characterized by the general formula:

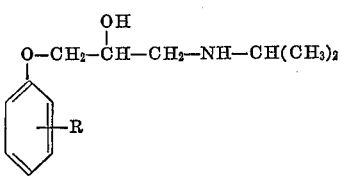

(1)

wherein R can be an allyl, propenyl, 2-chloroallyl or 3-chloroallyl radical.

The alkenylphenoxy - 2 - hydroxy - 3 - isopropylaminopropane described above may be conveniently prepared by a process which comprises reacting an alkenylphenoxy-2,3-epoxypropane, which may be represented by the formula

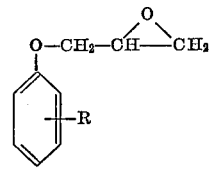

in which R is the same as described above, with a compound containing an active hydrogen atom and either an isopropylamino group or an atom or group of atoms which is capable of being converted into an isopropylamino group. These reactants may be characterized by the formula: H—X, wherein X may be a halogen atom or an amino group such as isopropylamine. When X is a halogen atom or an unsubstituted amino group, the resulting product can then be isopropylated by techniques which are well known, for example, by carrying out a reductive isopropylation in the presence of acetone and a reducing agent such as sodium borohydride, potassium borohydride, lithium aluminum hydride, and the like.

Since the new compounds described above contain an asymmetric carbon atom, they exist in optically active forms which can be resolved into optical antipodes by well-known techniques employing optically active acids such as tartaric acid, camphor-10-sulfonic acid and dibenzoyltartaric acid, and the like.

The alkenylphenyl-2,3-epoxypropyl ethers which are described above may be prepared by reacting a suitable alkenylphenol with an epihalohydrin such as epichlorohydrin. Suitable alkenylphenyl-2,3-epoxypropyl ethers include o-allylepoxypropoxybenzene, o-propenylepoxypropoxybenzene, o - (2 - chloroallyl)-epoxypropoxybenzene, o - (cis - 3 - chloroallyl) - epoxypropoxybenzene, p-allylepoxypropoxybenzene, p - propenylepoxypropoxybenzene, m - allylepoxypropoxybenzene, m - propenylepoxypropoxybenzene, and the like.

The alkenylphenoxy-isopropanolamines disclosed herein have been shown to possess valuable pharmacological properties. At relatively low dosage levels they have been found to block the effect of intravenously administered cardiac stimulants, such as isoprenaline, and the effects of sympathetic stimulation of the heart and the fat tissue. The orthoallyl compound, in particular, has been observed in clinical trials to be very useful in alleviating the effects of angina pectoris and in lowering blood pressure.

The acute and chronic toxicity of these compounds is very low, and experiments in man show that they are well absorbed from the gastrointestinal tract and that their effect is of long duration. The compounds may, therefore, be clinically used, in particular for the treatment of cardiac and vascular diseases under conditions such that the heart has to be protected against excessive sympathetic stimulation, e.g., during mental stress or muscular work, circumstances which are known to increase the level of the sympathomimetic amines epinephrine and norepinephrine in the blood. Moreover, the pharmacological and therapeutic effects of the ortho allyl compound can be significantly increased by resolving the racemic mixture into the optical isomers. This resolution can be accomplished without an increase in toxicity. More specifically, it has been found that although the levo form of the ortho allyl compound has approximately twice the therapeutic and pharmacological effects of the racemate, the toxicity of the levo form is less than the toxicity of the racemate.

In clinical practice the compounds of the invention will normally be administered orally, rectally or by injection, in the form of pharmaceutical preparations comprising the active ingredient either as a free base or as a pharmaceutically acceptable nontoxic, acid addition salt, e.g., the hydrochloride, lactate, acetate, sulfamate, and the like, in association with a pharmaceutically acceptable carrier. Accordingly, terms relating to the novel compounds of this invention whether generically or specifically are intended to include both the free amine base and the acid addition salts of the free base, unless the context in which such terms are used, e.g., in the specific examples, would be inconsistent with the broad concept. The carrier may be a solid, semisolid or liquid diluent or an ingestible capsule. These pharmaceutical preparations constitute a further aspect of this invention. Usually the active substance will constitute between 0.1 and 95% by weight of the preparation, more specifically between 0.5 and 20% by weight for preparations intended for injection and between 2 and 50% by weight for preparations suitable for oral administration.

To produce pharmaceutical preparations containing a compound of the invention in the form of dosage units for oral application, the selected compound may be mixed with a solid pulverulent carrier, e.g., lactose, saccharose, sorbitol, mannitol, starches such as potato starch, corn starch, amylopectin, laminaria powder or citrus pulp powder, cellulose derivatives, or gelatin, and a lubricant such as magnesium stearate, calcium stearate, polyethylene glycol waxes, and the like, and then compressed to form tablets. If coated tablets are required, the cores, prepared as described above, may be coated with a concentrated sugar solution which may contain, e.g., gum arabic, gelatin, talcum, titanium dioxide, and the like. Alternatively, the tablet can be coated with a lacquer dissolved in a readily volatile organic solvent or mixture of organic solvents. Dyestuffs may be added to these coatings in order to readily distinguish between tablets containing different active substances or different amounts of the active compound.

For the preparation of soft gelatin capsules (pearl-shaped closed capsules) consisting of gelatin and, e.g. glycerol, the active substance may be admixed with a vegetable oil. Hard gelatin capsules may contain granulates of the active substance in combination with solid, pulverulent carriers such as lactose, saccharose, sorbitol, mannitol, starches (e.g., potato starch, corn starch or amylopectin), cellulose derivatives or gelatin.

Dosage units for rectal application can be prepared in the form of suppositories comprising the active substance in admixture with a neutral fatty base, or gelatin rectal capsules comprising the active substance in admixture with vegetable oil or paraffin oil.

Liquid preparations for oral application may be in the form of syrups or suspensions, for example, solutions containing from about 0.2% to about 20% by weight of the active substance, herein described, the balance being sugar and a mixture of ethanol, water, glycerol, and propylene glycol. Optionally such liquid preparations may contain coloring agents, flavoring agents, saccharine and carboxymethylcellulose as a thickening agent.

Solutions for parenteral applications by injection can be prepared in an aqueous solution of a water-soluble pharmaceutically acceptable salt of the active substance preferably in a concentration of from about 0.5% to about 10% by weight. These solutions may also contain stabilizing agents and/or buffering agents and may conveniently be provided in various dosage unit ampules.

The following examples illustrate the principles and practice of the instant invention.

EXAMPLE 1

1-(o-allylphenoxy)-2,3-epoxypropane was prepared by dissolving 727 grams of o-allylphenol and 550 grams of epichlorohydrin in a solution containing 428 grams of potassium hydroxide in 3500 milliliters of water in a 5 liter flask. The solution was stirred overnight and the resulting product was then extracted with ether, dried over potassium carbonate and evaporated. The residue, a yellow oil, was distilled under vacuum at a temperature of from about 106° C. to 109° C. at a pressure of from 0.6 to 0.8 millimeter of mercury to yield 698.5 grams of product.

EXAMPLE 2

1-(o-propenylphenoxy)-2,3-epoxypropane was prepared by adding 22 grams of o-propenylphenol and 16.7 grams of epichlorohydrin to a solution of 13 grams of potassium hydroxide in 125 milliliters of water. The resulting solution was stirred overnight and the product was extracted with ether, dried over magnesium sulfate and evaporated. The residue was distilled under vacuum at a temperature of 94° C. to 100° C., at a pressure of 0.4 millimeter of mercury to yield 17.2 grams of product.

EXAMPLE 3

1-(o-2-chloroallylphenoxy)-2,3-epoxypropane was prepared by dissolving 12.8 grams of o-(2-chloroallyl) phenol in a solution containing 6 grams of potassium hydroxide in 50 milliliters of water and then adding thereto 7.9 grams of epichlorohydrin. The resulting mixture was stirred overnight and the reaction product was extracted with ether, dried over magnesium sulfate and evaporated. Upon distillation at a temperature of 108° C. to 110° C. and at a pressure of 0.25 millimeter of mercury, 7.0 grams of product were obtained.

EXAMPLE 4

1-(o-cis-3-chloroallyl)-2,3-epoxypropane was prepared by adding 12.5 grams of o-(cis-3-chloroallyl) phenol and 7.6 grams of epichlorohydrin to a solution of 5.8 grams of potassium hydroxide in 50 milliliters of water. The mixture was stirred overnight. The resulting product was extracted with ether, dried over magnesium sulfate and evaporated. Upon distillation, at a temperature of 120° C. to 125° C., and at a pressure of 0.3 millimeter of mercury, 9.0 grams of product were obtained.

Examples 5 through 12 illustrate the preparation of the active compounds of this invention.

EXAMPLE 5

1-(o-allylphenoxy)-2-hydroxy-3-isopropylaminopropane

An admixture of 698 grams (3.67 mols) of o-allyl-epoxypropoxybenzene and 3000 milliliters of isopropanol and 266 grams (4.5 mols) of isopropylamine was prepared in a 5 liter flask equipped with an efficient condenser. The solution was refluxed for 4 hours, after which the isopropylamine and the alcohol were distilled off. The resulting product of o-[3-(isopropylamino)-2-hydroxypropoxy]-allylbenzene was recrystallized from petrol ether (boiling range 40–60° C.). The yield was 643 grams of a product having a melting point of 58° C. The product was then dissolved in ether, an ethereal solution of hydrogen chloride added thereto and the hydrochloride salt precipitated. The resulting product was dissolved in a methanol-ethylacetate mixture and precipitated by the addition of ether. The yield was 624 grams of material having a melting point of 107° C.

EXAMPLE 6

1-(o-allylphenoxy)-2-hydroxy-3-isopropylaminopropane

A solution of 24.6 grams of o-allyl-epoxypropoxybenzene dissolved in 250 milliliters of absolute ethanol saturated with ammonia was placed in an autoclave and heated on a steambath for 2 hours. The alcohol was then removed by distillation and the residue was redissolved in a mixture of methonal and ethylacetate. Hydrogen chloride gas was introduced into the solution. The hydrochloride salt was then precipitated by the addition of ether to yield 11.4 grams of product. Five grams of the amine-hydrochloride thus formed were dissolved in 50 milliliters of methanol and 9 milliliters of acetone. The resulting solution was cooled to about 0° C. At this temperature 5 grams of sodium borohydride were added over a period of 1 hour. Another 2.2 milliliters of acetone and 0.8 gram of sodium borohydride were added and the solution was kept at room temperature for 1 hour, after which 150 milliliters of water were added to the solution. The solution was then extracted with three 100-milliliter portions of ether which were combined, dried over potassium carbonate, and evaporated. The free base was then recrystallized from petrol ether (boiling range 40–60° C.) to yield 2.7 grams of material having a melting point of 57° C.

EXAMPLE 7

1-(o-propenylphenoxy)-2-hydroxy-3-isopropylaminopropane hydrochloride

A mixture of 7.1 grams of o-propenylepoxypropoxybenzene, 3 grams of isopropylamine and 60 milliliters of isopropanol was refluxed for 3 hours. The solvent was then distilled off and the crystalline residue which had a melting point of 83° C. was dissolved in a methanol-ethylacetate mixture to which hydrogen chloride was introduced. The hydrochloride salt was then precipitated by the addition of ether to the solution. Recrystallization of the resulting product from acetone gave 6.5 grams of material having a melting point of 131° C.

EXAMPLE 8

1-(o-propenylphenoxy)-2-hydroxy-3-isopropylaminopropane hydrochloride

Ten grams of o-propenyl-epoxypropoxybenzene was dissolved in 10 milliliters of absolute ethanol and the solution was saturated with ammonia. The resulting reaction mixture was placed in an autoclave and heated on a waterbath for 2 hours. The alcohol was then removed and the residue dissolved in methanol-ethylacetate. Hydrogen chloride was introduced into the solution, after which the hydrochloride salt was precipitated by the addition of ether. The yield was 6.7 grams of the hydrochloride salt having a melting point of 166° C. The amine base was liberated from the hydrochloride and was dissolved in 35 milliliters of methanol and 5.5 milliliters of acetone to which 0.5 gram of sodium borohydride was then added and the solution stirred at room temperature for 1 hour. One hundred milliliters of water were added to the solution and then the solution was extracted with ether (three 100-milliliter portions), dried over potassium carbonate and evaporated. The resulting residue was dissolved in methanol-ethylacetate, and hydrogen chloride was introduced. The hydrochloride salt was then precipitated by the addition of ether. Recrystallization from acetone gave 1.4 grams of the hydrochloride salt having a melting point of 130° C.

EXAMPLE 9

1-(o-2-chloroallylphenoxy)-2-hydroxy-3-isopropylaminopropane hydrochloride

Four grams of o-(2-chloroallyl)-epoxypropoxybenzene were dissolved in 30 milliliters of isopropanol and 2.5 grams of isopropylamine were added thereto. The resulting solution was refluxed for 4 hours, whereupon the alcohol and unreacted amine were distilled off. The residue was dissolved in methanol-ethylacetate, and hydrogen chloride was introduced into the solution. The hydrochloride salt was then precipitated by the addition of ether. After recrystallization from acetone, 1 gram of the hydrochloride salt having a melting point of 105° C. was obtained.

EXAMPLE 10

1-(o-cis-3-chlorallylphenoxy)-2-hydroxy-3-isopropylaminopropane hydrochloride

A mixture of 7.2 grams of o-(cis-3-chloroallyl)-epoxypropoxybenzene, 4.5 grams of isopropylamine and 75 milliliters of isopropanol was refluxed for 4 hours. The solvent was distilled off and the residue dissolved in ether. The hydrochloride salt was then precipitated by the addition of a solution of hydrogen chloride in ether. On recrystallization from a mixture of methanol-ethylacetate and reprecipitating with ether, 6.7 grams of a product having a melting point of 100° C. was obtained.

EXAMPLE 11

1-(p-allylphenoxy)-2-hydroxy-3-isopropylaminopropane

Epichlorohydrin (5.5 grams) was added to a solution containing 4 grams of p-allylphenol and 2 grams of sodium hydroxide in 25 milliliters of water. The resulting mixture was stirred overnight and the reaction product then extracted with ether. The ether solution was dried over magnesium sulphate and evaporated to provide 6.5 grams of a reaction product residue (p-allylepoxypropoxybenzene) which was used without further purification.

A mixture of 6.5 grams of isopropylamine, 6.5 grams of isopropanol, and 6.5 grams of the p-allyl-epoxypropoxybenzene was refluxed with continual stirring for about 4 hours. The isopropanol and unreacted isopropylamine were then removed by distillation. The resulting reaction product was dissolved in 2 M hydrochloric acid, and the solution was washed with ether. The acid solution was then made alkaline, and the amine thus liberated was extracted with ether. The ether solution was then dried over potassium carbonate and the excess solvent evaporated. The 1-(p-allylphenoxy)-2-hydroxy-3-isopropylaminopropane was then recrystallized twice from petroleum ether (boiling range 40° C. to 60° C.) to provide 2.9 grams of a product having a melting point of 55° C.

The corresponding hydrochloride was prepared by dissolving 2 grams of the product, prepared above, in 20 milliliters of acetone, and adding to the resulting solution acetone saturated with hydrogen chloride until the pH was reduced to about 3. The precipitated hydrochloride salt was then recrystallized from acetone to yield 1.5 grams of a material having a melting point between 107° C. and 109° C.

EXAMPLE 12

1-(m-allylphenoxy)-2-hydroxy-3-isopropylaminopropane m-Allylepoxypropoxybenzene was prepared by reacting 21 grams (0.157 mole) of m-allylphenol dissolved in a solution containing 7.5 grams of sodium hydroxide, 27 grams of epichlorohydrin, and 125 milliliters of water After stirring the above reaction mixture overnight, the reaction product was extracted with ether, washed with water, and dried over sodium sulphate. The ether was evaporated and the residue (26.5 grams) of m-allylepoxypropoxybenzene was employed to prepare 1-(m-allylphenoxy)-2-hydroxy-3-isopropylaminopropane without further purification as described below.

A reaction mixture comprising 26 grams of isopropylamine, 26 grams of isopropanol, and 26 grams of the m-allylepoxypropoxybenzene prepared above was refluxed for 4 hours after which the isopropanol and any unreacted isopropylamine were removed by distillation. The residue was dissolved in 2 N hydrochloric acid and the resulting solution washed with ether. The free amine was then liberated by making the acid solution alkaline. The amine was extracted, and after drying with potassium carbonate, the ether was evaporated. The residue was then recrystallized twice from petroleum ether (boiling range 40° C.–60° C.) to provide 12.5 grams of material having a melting point of 66° C.

EXAMPLE 13

Resolution of 1-(o-allylphenoxy)-2-hydroxy-3-isopropylaminopropane

In 10 milliliters of methanol there was dissolved 2.48 grams of 1-(o-allylphenoxy)-2-hydroxy-3-isopropylaminopropane and 1.5 grams of D tartaric acid. A mixture of ethylacetate-ether was added to the resulting solution. After several days the precipitated crystals obtained were recrystallized from methanol-ethylacetate until the optical rotation was constant. The product was found to have a melting point of 90° C.

$[a]_D^{20} = 8.2°$, (C.=1, H$_2$O)

$[a]_{313}^{20} = 76.5°$, (C.=1, H$_2$O)

Examples 14–17 illustrate the preparation of pharmaceutical formulations containing the active ingredients of this invention.

EXAMPLE 14

A syrup containing 2% (weight per volume) of the active substance was produced from the following ingredients:

| | |
|---|---|
| 1-(o-allyphenoxy)-2-hydroxy-3-isopropylaminopropane HCl _____g__ | 2.0 |
| Saccharin _____g__ | 0.6 |
| Sugar _____g__ | 30.0 |
| Glycerol _____g__ | 5.0 |
| Flavoring agent _____g__ | 0.1 |
| Ethanol 96% _____ml__ | 10.0 |
| Distilled water, to 100.0 ml. | |

The sugar, saccharin and the ether salt were dissolved in 60 grams of hot water. After cooling, the glycerol and a solution of the flavoring agent in ethanol was added. The mixture was then made up to a volume of 100 milliliters with water.

The active substances shown above may be replaced by other pharmaceutically acceptable acid addition salts.

EXAMPLE 15

Two hundred and fifty grams of 1-(o-allylphenoxy)-2-hydroxy-3-isopropylaminopropane hydrochloride were mixed with 175.8 grams of lactose, 169.7 grams of potato starch and 32 grams of colloidal silica. The mixture was moistened with a 10% gelatin solution and granulated through a 12 mesh sieve. After drying, 160 grams of potato starch, 50 grams of talc, 2.5 grams of magnesium stearate were mixed in and the resulting mixture was pressed into tablets (10,000) containing 25 milligrams of active substance which were suitable for use as tablets. The tablets were marked with break lines to enable a dose other than 25 milligrams or multiples thereof to be administered.

EXAMPLE 16

A granulate was prepared from 250 grams of 1-(o-propenylphenoxy) - 2 - hydroxy - 3 - isopropylaminopropane hydrochloride, 175.9 grams of lactose and an alcoholic solution of 25 grams of polyvinylpyrrolidone. After drying, the granulate was mixed with 25 grams of talc, 40 grams of potato starch and 2.50 grams of magnesium stearate and pressed into 10,000 biconvex tablets. These tablets were first coated with a 10% alcoholic shellac solution then with a water solution containing 45% of saccharose, 5% gum acacia, 4% of gelatin and 0.2% of dyestuff. Talc and sugar powder were used as dusting powders after the first 15 applications. The coating was then finished with a 66% sugar syrup and polished with a 10% carnauba wax solution in carbon tetrachloride.

EXAMPLE 17

One gram of 1-(o-allylphenoxy)-2-hydroxy-3-isopropylaminopropane hydrochloride, 0.8 gram of sodium chloride and 0.1 gram of ascorbic acid were dissolved in sufficient distilled water to make 100 milliliters of solution. This solution, each milliliter of which contained 10 milligrams of the active substance, was used to fill ampules which were sterilized by heating for 20 minutes at 120° C.

The alkenylphenoxy - propoxy - isopropanolamines described herein, including the optical isomers and racemic mixtures thereof, have been shown to possess valuable pharmacological properties. In low doses they block the effect of intravenously administered isoprenaline as well as the effects of sympathetic stimulation on the heart.

The results of some pharmacological tests on the ortho isomers conducted on mice and cats are given in Table I below.

In determining the approximate toxicity in mice, male mice weighing 25–30 grams were used and the injections were carried out at the rate of 0.1 ml. per 10 seconds. The animals were observed for 72 hours. Comparisons made with propranolol and pronethalol are shown in the table.

In this study on a hexamethonium-treated cat, the cat was anesthetized with nembutal sodium (30 mg. per kilog of body weight) intraperitoneously. Intra-arterial mean blood pressure, heart rate, and contractile heart force (the latter with a straingauge arch attached to the right ventricle) were registered. Both vagus nerves were divided at the neck. Artificial respiration was given. Hexamethonium chloride was given intravenously at a dose of 4 mg. per kilog of body weight, at an interval of 25 minutes; preparatory tests showed that this dose blocked preganglionic sympathetic stimulation of the heart without affecting the effect of postganglionic stimulation. After the first dose of hexamethonium chloride a mixture of 5% Macrodex® and 1% Rheomacrodex® was administered (at about 5 mg. per kilog of body weight) to compensate for the hypotensive effect of the hexamethonium chloride.

Following the preparation of the cat as described above, an intravenous isoprenaline dose, which gave a pronounced but submaximal positive, chronotropic and inotropic heart effect was administered. Then, at intervals of 25 minutes, intravenous injections of the test compound were given in increased doses for 2 minutes. Ten minutes thereafter isoprenaline at the same dose as had been tested initially was given. For comparison propranolol and pronethalol were also tested.

TABLE I

| Compound | Hexamethonium-Treated Cat | | | White mice—intraperitoneal toxicity (LD50) in mg./kg. body-weight |
| --- | --- | --- | --- | --- |
| | Cardiac block of isoprenaline relative potency | "Unspecific" heart depression relative potency | Intrinsic heart stimulation | |
| Propranolol | 1 | 1 | 0 | 120 |
| Pronethalol | 0.1–0.2 | 1–2 | Weak | 110 |
| Formula (1) wherein R is: | | | | |
| Allyl, racemate | 1 | 2 | Very weak | 90 |
| Allyl, levo | 2 | 2 | Weak | 110 |
| Allyl, dextro | 0.03 | 2 | 0 | 90 |
| 2-chloroallyl | 1 | 2 | Very weak | 110 |
| 3-chloroallyl | 0.2 | 2 | Weak | 100 |
| Propenyl | 1 | 2 | do | 100 |

An evaluation of the clinical effects of the compound 1 - (o - allylphenoxy) - 2 - hydroxy-3-isopropylaminopropane hydrochloride was made. The drug was administered orally to 21 patients in single or in several daily doses for a period of up to 10 consecutive days. It was thereby observed that the compound only slightly changed the hemodynamic values at rest. During exercise the cardiac output was unaltered and the stroke volume of the heart increased. The blood pressure was lowered and the heart rate was markedly lowered.

In patients with arrhythmia (mostly extra systoles) or minor cardiovascular disorders, the test compound was administered for 10 consecutive days in four daily oral doses of 40 mg. Before, during, and after the medication frequent recordings of blood pressure, heart rate and electrocardiograms were made. Furthermore, a detailed study of possible effects on liver and kidney functions and of the blood picture was performed by means of routine clinical chemical tests performed almost daily. In some patients with arrhythmia who had previously been treated with quinidine or propranolol without success, the test compound was likewise ineffective. However, it was found to produce no adverse effects on the physiological and chemical tests carried out on any patient. In two patients a total dose of 360 mg. of the test compound was administered in three equal doses during one day. No unfavorable symptoms were reported and the clinical biochemical tests were unchanged. Five patients with minor cardiovascular disorders were studied after a single oral dose of 40 mg. of the test compound. In all subjects a rapidly occurring increase in water excretion was found, but no consistent hemodynamic changes were observed. The observed electrolyte excretion, the mechanism of which is not yet understood, may be of therapeutic value. In five patients with various types of arrhythmia, 1 - (o - allylphenoxy) - 2 - hydroxy-3-isopropylaminopropane hydrochloride was given orally (10–40 mg. daily in divided doses) with subjective good results. No side-effects were observed.

These clinical tests indicate that in accordance with the pharmacological tests the compounds may be clinically used, in particular for the treatment of cardiac disorders in vascular diseases when the heart has to be protected against excessive sympathetic stimulation, e.g., during mental stress or muscular work, which are known to increase blood levels of the sympathomimetic amines, epinephrine and norepinephrine.

Examples 18–21 describe further clinical tests on the compounds of the invention.

EXAMPLE 18

In two experiments on a male test subject, the effects of orally administered 1 - (o - allylphenoxy)-2-hydroxy-3 - isopropylaminopropane hydrochloride were studied. In one of the experiments the influence of the compound on the effects of isoprenaline and epinephrine on blood pressure and heart rate was studied; in the other, the effects on blood pressure and heart rate at rest and during work on an ergometric bicycle were registered auscultatorally on the upper part of the arm.

In the first experiment, the subject, who had fasted for 15 hours prior to the experiment, was placed in a supine position. First, the effects of intravenous infusion of isoprenaline (0.04 µg. of 1-isoprenaline sulfate per kilog of body weight per minute for 5 minutes) and then the effects of epinephrine (0.2 µg. of 1-epineprine hydrochloride per kilog of body weight per minute for 5 minutes) were registered. Then the test compound was administered orally at a dose of 0.5 mg. per kilog of body weight (total dose 40 mg.) dissolved in 100 milliliters of water. Thirty and eighty minutes thereafter isoprenaline was again administered and 55 minutes after administration of the test compound epinephrine was again administered.

The 1 - (o - allylphenoxy) - 2 - hydroxy-3-isopropylaminoprapane hydrochloride produced no subjective symptoms and did not significantly change the basal blood pressure and heart rate. The effect of the isoprenaline on heart rate and blood pressure was significantly weakened by the prior administration of the test compound, both 30 and 80 minutes after treatment with isoprenaline. The epinephrine produced a pure pressor effect and bradycardia whereas the systolic blood pressure increased to a lesser degree than was found prior to the administration of the test compound.

These results indicate that the dominating function of the test compound in man was that of a cardiovascular β-receptor blockade. The substance blocked the β-receptor activation of epinephrine, but not the activation of vascular α-receptors.

In another experiment, the test subject was placed on a bicycle ergometer. After stable registrations of rest values for blood pressure and heart rate had been obtained, the test subject engaged in work loads of 600, 900, and 1200 kpm./min. The duration of each work load was six minutes. Stable values for blood pressure and heart rate were observed during the last two minutes of each work load period.

The same work load series was repeated one hour after oral administration of 0.75 mg. per kilog of body weight of 1 - (o - allylphenoxy) - 2-hydroxy-3-isopropylaminopropane hydrochloride dissolved in water (total dose 60 mg.). Two and a half hours and again four hours after administration, studies were made while the person was at rest and during a work load of 600 kpm./min.

The rest values for heart rate and blood pressure did not change after administration of the test compound; however, the heart rate, during work, was considerably lower. The effect of the test compound was most pronounced one hour after the administration and it had ceased after four hours. The test compound also had a tendency to reduce the systolic blood pressure during work. It produced no subjective symptoms at rest or during work.

These results indicate that the test compound reduced the sympathetic tone of the heart during work without significantly inhibiting the physical ability to perform work.

EXAMPLE 19

The effects of orally administered 1-(o-allylphenoxy)-2-hydroxy-3-isopropylaminopropane hydrochloride and propranolol were studied in one male subject. The investigation was carried out on a subject in a recumbent position after he had fasted for 15 hours before the experiment. The systolic and diastolic blood pressures were recorded by auscultation with a cuff on the upper arm and the heart rate was observed from an electrocardiogram recording.

Firstly, the effect of an intravenous infusion of isoprenaline (0.04 μg. of 1-isoprenaline sulfate per kilog of body weight per minute) and of epinephrine (0.2 μg. of 1-epinephrine chloride per kilog of body weight per minute) given during the first five minutes of the experiment were recorded. Then the test compounds (0.5 mg./kg. dissolved in 100 ml. of water) were given. The isoprenaline infusion and the epinephrine infusion were repeated at 30 and 80 minutes, and at 55 and 60 minutes, respectively, after the administration of the test compound.

Neither the propranolol nor the 1-(o-allylphenoxy)-2-hydroxy-3-isopropylaminopropane hydrochloride produced any subjective symptoms. No changes in basal heart rate and blood pressure were observed after the administration of 1 - (o - allylphenoxy)-2-hydroxy-3-isopropylaminopropane hydrochloride, but the effect of isoprenaline on the heart rate and blood pressure was reduced when administered both 30 and 80 minutes after the administration of the 1-(o-allylphenoxy)-2-hydroxy-3-isopropylaminopropane hydrochloride. The epinephrine response was converted to a pure pressor effect accompanied by bradycardia.

EXAMPLE 20

In four subjects a double blind study of orally administered 1 - (o-allylphenoxy)-2-hydroxy-3-isopropylaminopropane hydrochloride and a placebo was performed. Two experiments were made on each subject. In one of the experiments two tablets containing 20 mg. of the test compound were administered; in the other, two identical placebo tablets were employed. The subjects, who had eaten a light meal 1.5–12 hours before the start of the experiment, were in supine position with an indwelling plastic needle in an antecubital vein. Systolic and diastolic blood pressures were recorded by conventional auscultatory technique. Heart rate was continuously recorded by electrocardiogram.

After a period of rest of about 30 minutes, the experiments were started by recording the blood pressures at 2 to 5 minute intervals for 20 minutes. Then 1-isoprenaline was administered intravenously for 5 minutes from a motor-driven syringe (0.02 μg. of 1-isoprenaline sulfate per kilog of body weight per minute dissolved in physiological saline solution containing 0.1% of ascorbic acid, at a rate of 1 milliliter per minute). Blood pressure and heart rate were recorded every minute during infusion and up to 5 minutes after the end of the infusion, and thereafter every 5 minutes. Twenty-five minutes after the end of the isoprenaline infusion 2 tablets of the test compound or 2 placebos were given orally together with 100 milliliters of water. Forty-five minutes later isoprenaline was administered as initially, and this was repeated every 45 minutes, the last infusion being given 3 hours after the administration of the tablets.

In this study the rest values for blood pressure and heart rate, before administration of the test compound, were, in all four subjects, somewhat higher in the first experiment than in the second. This difference could be due to the nervous tension induced by lack of experience of the test.

The heart rate at rest showed a tendency to decrease after administration of the test compound but the same effect was observed in the placebo experiments. The results indicate that the test compound did not significantly change the rest values for the blood pressure and the heart rate.

Three subjects had normal electrocardiogram complexes both before and after administration of the drug. One subject had a history of frequent extrasystoles in stress periods. He had frequent, single, monofocal ventricular extrasystoles through the whole first experiment both before and after administration of the test compound. During the first isoprenaline infusion they disappeared almost completely but reappeared immediately afterwards. After the administration of the test compound their frequency was definitely lower.

The intravenous infusion of isoprenaline increased the systolic blood pressure, decreased the diastolic blood pressure and augmented the heart rate. During the infusion of isoprenaline all subjects had an unpleasant palpitation and throbbing headache synchronous with the pulse, with maximum discomfort during the last minutes of the infusion. After the administration of the test compound the effects of isoprenaline on blood pressure and heart rate were markedly decreased. The subjective sensations created by isoprenaline were almost or completely abolished by the test compound. When placebos were given the objective and subjective responses to the repeated isoprenaline infusion did not change significantly during the entire study. No undesirable side-effects were observed. Two subjects reported imperative miction needs one hour after the administration of the test compound, and the other two voided a large volume of urine immediately after the test compound was given. No such effect was observed in the tests in which placebos were employed.

EXAMPLE 21

The local anesthetic effect of 1% solution of 1-(o-allylphenoxy)-2-hydroxy-3-isopropylaminopropane hydrochloride in the form of the racemic mixture and the isomers were investigated in two healthy volunteers. Lidocaine [1] hydrochloride of the same concentration was included in this test as a basic of comparison. The four solutions were administered from coded bottles by injecting 0.1 milliliter intradermally on the volar side of the forearm. The code was broken only after the study had been completed.

The duration of the local anesthesia was noted and the maximum anesthetic area was measured for each intradermal wheal. The local anesthesia was studied by pricking the skin with a sharp needle. The mean value results are given in Table II below.

TABLE II

| Compound | Maximum area of anest., mm. | Duration of local anest., min |
|---|---|---|
| 1-(o-allylphenoxy)-2-hydroxy-3-isopropyl-aminopropane hydrochloride, racemate | 14 x 14 | 63 |
| 1-(o-allylphenoxy)-2-hydroxy-3-isopropyl-aminopropane hydrochloride, dextro | 12.5 x 12.5 | 63 |
| 1-(o-allylphenoxy)-2-hydroxy-3-isopropyl-aminopropane hydrochloride, levo | 7 x 7 | 30 |
| Lidocaine [1], hydrochloride | 7 x 7 | 63 |

[1] α-diethylamino-aceto-2,6-xylidide.

The results show that the racemic mixture and the isomers of 1 - (o - allylphenoxy)-2-hydroxy-3-isopropylaminopropane hydrochloride have local anesthetic properties in man which are equal to or better than Lidocaine.[1]

Table III below, contains pharmacological data comparing the ortho, meta and para isomers of allylphenoxy-hydroxyalkyl isopropylamine.

TABLE III.—EFFECTS OF POSITION ISOMERS OF THE ALLYL DERIVATIVES

| Compound of Formula I wherein R is— | Intrinsic heart stimulation [1] | Blood pressure | Positive chronotropic and inotropic response | Acute toxicity in mice LD$_{50}$, mg./kg. |
|---|---|---|---|---|
| Ortho allyl | Very weak | 0.01 | 0.1 | 100 |
| Meta allyl | weak | 0.02 | 0.2 | 115 |
| Para allyl | very weak | 5 | 0.5 | 150 |

[1] Rabbit Langendorff heart.
[2] Hexamethonium treated cat i.v. administration.

As mentioned above the compounds of this invention can be resolved into their optical isomers. Table IV below, sets forth data showing a comparison of the pharmacological properties of the optical isomers of o-(allylphenoxy)-2-hydroxy-3-isopropylamino propane.

It can be seen from Table IV that increased therapeutic and pharmacoloical effects can be provided by resolving the racemic mixture into its optical antipodes without an increase in toxicity, whereas, an increase in toxicity for the more useful antipode is generally expected when a racemate is resolved into its antipodes.

TABLE IV.—EFFECTS OF O-(ALLYLPHENOXY)-2-HYDROXY-3-ISOPROPYLAMINOPROPANE RACEMATE AND ANTIPODES

| | Racemate | Levo | Dextro |
|---|---|---|---|
| Isolated papillary muscle: | | | |
| Isoprenaline block ED$_{50}$, μg./ml | 13×10$^{-3}$±4×10$^{-3}$ | 6×10$^{-3}$±2×10$^{-3}$ | 357×10$^{-3}$±143×10$^{-3}$ |
| Langendorff heart: | | | |
| Lowest dose producing block of adrenaline, μg./min | 0.02–0.2 | 0.01–0.1 | 0.05–5.0 |
| Lowest dose producing depression of spontaneous heart activity, μg./min | 2–5 | 3–5 | 5 |
| Anesthetized hexamethonium-treated cat.: | | | |
| Blockade of isoprenaline-induced heart stimulation ED$_{50}$, mg./kg | 0.1 | 0.05 | 2.0 |
| Blockade of isoprenaline-induced hypotension ED$_{50}$, mg./kg | 0.01 | 0.005 | 0.1 |
| Intrinsic heart stimulation produced by lower beta-blocking doses | ([1]) | ([1]) | ([2]) |
| Unspecific myocardial depression. More than 20 percent decrease of intrinsic contractile force, mg./kg | 8 | 8 | 8 |
| Death in myocardial failure, mg./kg | 32 | 32 | 32 |
| Preliminary LD$_{50}$ in mouse, I.p. administration mg./kg | 100 | 140 | 90 |

[1] Very slight.
[2] Almost none.

We claim:
1. A method for treating cardiovascular diseases which comprises administering to a host suffering from cardiovascular diseases an effective dose of a compound having the formula

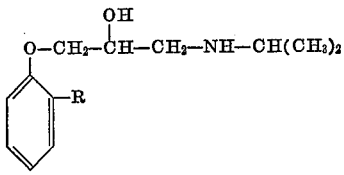

wherein R is a radical selected from the group consisting of allyl, propenyl, 2-chloroallyl, and 3-chloroallyl or a pharmaceutically acceptable salt thereof.

2. The method of claim 1 wherein the compound is selected from the group consisting of a 1-(o-allylphenoxy)-2-hydroxy-3-isopropylaminopropane, and the pharmaceutically acceptable salts thereof.

3. The method of claim 1 wherein the compound is selected from the group consisting of the levo isomer of 1-(o-allylphenoxy)-2-hydroxy-3-isopropylaminopropane, and the pharmaceutically acceptable salts thereof.

4. A method for overcoming the effect of increased blood levels of sympathetic amines which comprises administering to a host suffering from increased blood level of sympathetic amines an effective dose of a compound having the formula

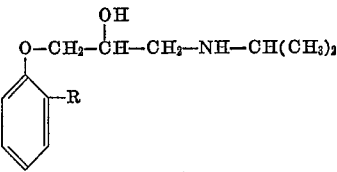

wherein R is a radical selected from the group consisting of allyl, propenyl, 2-chloroallyl, and 3-chloroallyl or a pharmaceutically acceptable salt thereof.

5. The method of claim 1 wherein the compound is selected from the group consisting of 1-(o-allylphenoxy)-2-hydroxy-3-isopropylaminopropane and the pharmaceutically acceptable salts thereof.

6. The method of claim 4 wherein the compound is selected from the group consisting of the levo isomer of 1-(o-allylphenoxy)-2-hydroxy-3-isopropylaminopropane and the pharmaceutically acceptable salts thereof.

7. The method for treating hypertension which comprises administering to a host suffering from hypertension an effective dose of a compound having the formula

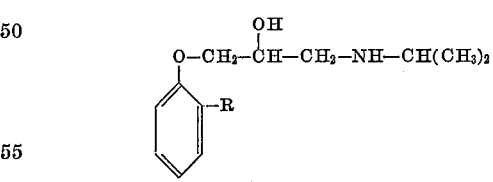

wherein R is a radical selected from the group consisting of allyl, propenyl, 2-chloroallyl, and 3-chloroallyl, or a pharmaceutically acceptable salt thereof.

8. The method of claim 7 wherein the compound is selected from the group consisting of 1-(o-allylphenoxy)-2-hydroxy-3-isopropylaminopropane or a pharmaceutically acceptable salt thereof.

9. A pharmaceutical preparation which comprises a pharmaceutically acceptable carrier and from about 0.1 to about 95% by weight of the compound having the formula

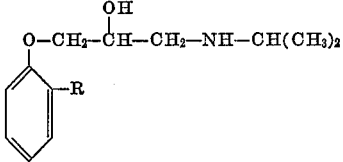

wherein R is a radical selected from the group consisting of allyl, propenyl, 2-chloroallyl, and 3-chloroallyl, or a pharmaceutically acceptable salt thereof.

10. An injectable pharmaceutical preparation which comprises from about 2 to about 50% by weight of the compound defined in claim 9.

11. A pharmaceutical preparation for parenteral application which comprises an aqueous solution of a water-soluble salt of a compound as defined in claim 9 in an amount of about 0.5 to about 10% by weight.

12. A pharmaceutical preparation for oral administration containing a compound as defined in claim 9 in a combination with a solid pharmaceutically acceptable diluent, said compound being present in the amount of from about 2 to about 50% by weight.

13. The composition of claim 9 wherein the compound is selected from the group consisting of 1-(o-allylphenoxy)-2-hydroxy-3-isopropylaminopropane and the pharmaceutically acceptable salts thereof.

14. The composition of claim 9 wherein the compound is selected from the group consisting of the levo isomer of 1-(o-allylphenoxy)-2-hydroxy-3-isopropylaminopropane and the pharmaceutically acceptable salts thereof.

References Cited

UNITED STATES PATENTS

| 3,317,553 | 5/1967 | Crowther et al. | 260—307 |
| 2,967,201 | 1/1961 | Soper | 167—65 |
| 3,328,424 | 6/1967 | Schenker et al. | 165—65 |

FOREIGN PATENTS

| 641,133 | 11/1963 | Belgium. |
| 650,719 | 7/1965 | Belgium. |
| 1,394,771 | 9/1965 | France. |
| 900,164 | 8/1964 | Ireland. |

ALBERT T. MEYERS, Primary Examiner

S. J. FRIEDMAN, Assistant Examiner

U.S. Cl. X.R.

260—570.7

UNITED STATES PATENT OFFICE
CERTIFICATE OF CORRECTION

Patent No. 3,466,376           September 9, 1969

Arne Elof Brandstrom et al.

It is certified that error appears in the above identified patent and that said Letters Patent are hereby corrected as shown below:

Column 5, line 5, cancel "of"; line 23, "methonal" should read methanol --. Column 12, line 44, "basic" should read -- bas: --. Column 13, line 24, "pharmacoloical" should read -- pharmacological --; line 53, "diseases" should read -- dise& --; line 69, cancel "a". Column 14, line 18, "1" should read -- 4 --. Column 16, line 15, "900,164" should read -- 900 --

Signed and sealed this 22nd day of September 1970.

(SEAL)

Attest:

Edward M. Fletcher, Jr.           WILLIAM E. SCHUYLER, JR.

Attesting Officer                Commissioner of Patents